United States Patent

Wasserman et al.

[11] Patent Number: 6,028,151
[45] Date of Patent: Feb. 22, 2000

[54] CATALYST COMPOSITION HAVING IMPROVED COMONOMER REACTIVITY

[75] Inventors: Eric Paul Wasserman, Hopewell; Sun Chueh Kao; Frederick John Karol, both of Belle Mead, all of N.J.

[73] Assignee: Union Carbide Chemicals & Plastics Technology Corporation, Danbury, Conn.

[21] Appl. No.: 09/030,436

[22] Filed: Feb. 25, 1998

Related U.S. Application Data

[62] Division of application No. 08/563,702, Nov. 28, 1995, Pat. No. 5,756,416.

[51] Int. Cl.⁷ ........................................................ C08F 4/44
[52] U.S. Cl. .................... 526/129; 526/153; 526/160; 526/348.5; 526/348.6; 526/901; 526/943
[58] Field of Search ...................... 526/129, 153, 526/160, 943, 901, 348.5, 348.6

[56] References Cited

U.S. PATENT DOCUMENTS

| 4,242,479 | 12/1980 | Yokota et al. | 526/124 |
| 5,122,491 | 6/1992 | Kioka et al. | 502/117 |
| 5,840,645 | 11/1998 | Ohno et al. | 502/117 |

FOREIGN PATENT DOCUMENTS

| 287666 | 10/1988 | European Pat. Off. |
| 367503 | 5/1990 | European Pat. Off. |
| 368644 | 5/1990 | European Pat. Off. |
| 406912 | 1/1991 | European Pat. Off. |
| 545152 | 6/1993 | European Pat. Off. |
| 582480 | 2/1994 | European Pat. Off. |
| 60-130604 | 7/1985 | Japan . |

OTHER PUBLICATIONS

Soga, et al., "Activation of $SiO_2$-supported zirconocene catalysts by common trialkylaluminiums", Makromol Chem 194: 3499–3504 (1993).

Primary Examiner—David W. Wu
Assistant Examiner—Roberto Rabago
Attorney, Agent, or Firm—P. W. Leuzzi

[57] ABSTRACT

A process for producing an olefin polymer, which comprises contacting at least two olefin monomers under polymerization conditions with a catalyst composition comprising A) an aluminoxane-impregnated support prepared by contacting an aluminoxane with an inert carrier material and heating to a temperature of at least about 80° C.; B) a metallocene of the formula:

$$(L)_y(L')MY_{(x-y-1)}$$

wherein M is a metal from groups IIIB to VIII of the Periodic Table; each L and L' is independently a cycloalkadienyl group bonded to M; each Y is independently hydrogen, an aryl, alkyl, alkenyl, alkylaryl, or arylalkyl radical having 1–20 carbon atoms, a hydrocarboxy radical having from 1–20 carbon atoms, a halogen, $RCO_2$—, or $R_2N$—, wherein R is a hydrocarbyl group containing 1 to about 20 carbon atoms; y is 0, 1, or 2; x is 1, 2, 3, or 4; and $x-y \geq 1$; C) a bulky aluminum alkyl of the formula:

$$AlR^1_x R^2_{(3-x)}$$

wherein $R^1$ is a hydrocarbyl group having 1 to 12 carbon atoms; x is an integer from 0 to 2; $R^2$ is a hydrocarbyl group of the formula $—(CH2)_y— R^3$, wherein y is an integer from 1 to 8; and $R^3$ is a saturated or unsaturated hydrocarbyl group having 3 to 12 carbon atoms containing at least one ring, and D) methylaluminoxane is provided. The catalyst composition may be used to prepare olefin polymers having increased short chain branching frequency.

8 Claims, No Drawings

CATALYST COMPOSITION HAVING IMPROVED COMONOMER REACTIVITY

This application is a division of U.S. application Ser. No. 08/563,702, filed Nov. 28, 1995, now U.S. Pat. No. 5,756,416.

A catalyst composition is provided that is particularly useful for the preparation of olefin polymers, such as ethylene polymers, having increased short chain branch frequency at a given level of comonomer.

BACKGROUND OF THE IVENTION

Simple unbridged metallocenes, such as bis(cyclopentadienyl)zirconium dichloride, are relatively inexpensive to synthesize compared with metallocenes having more complicated ligand structures, such as bridged metallocenes. However, when used to copolymerize olefins, unbridged metallocenes tend to incorporate comonomer poorly and chain terminate following comonomer insertion, producing olefin polymers with unacceptably low short chain branch frequency and molecular weight. In order to take advantage of their low cost, it would therefore be desirable to boost the ability of simple, unbridged metallocenes to make high molecular weight polyolefins having increased short chain branch frequency at a given level of comonomer.

EP 0 582 480 A2 describes an olefin polymerization catalyst comprising (A) an organoaluminum oxy-compound, (B) a transition metal compound of a Group IVB metal containing one or more ligands having a cyclopentadienyl skeleton, and (C) a hydrogenated organoaluminum compound of the formula $H_nAlR_{3-n}$, wherein R is an alkyl, cycloalkyl or aryl group and n is 1 or 2. The catalyst may also contain a carrier.

EP 0 406 912 B1 and EP 0 287 666 B1 relate to catalyst compositions comprising (A) a transition metal compound of the formula $R^1R^2R^3R^4Me$, wherein $R^1$ is a cycloalkadienyl group, $R^2$, $R^3$, and $R^4$ are cycloalkadienyl groups or other moieties, and Me is zirconium, titanium or hafnium, (B) an aluminoxane, and (C) an organoaluminum compound having a hydrocarbon group other than an n-alkyl group, which catalyst compositions are optionally supported. Polymers produced using such catalysts are reported to have narrow molecular weight distributions and narrow compositional distributions.

Similarly, U.S. Pat. No. 5,122,491 describes olefin polymerization in the presence of a catalyst composition prepared from (A) a Group IVB transition metal compound, or (A') a Group IVB transition metal compound supported on a fine-particle carrier, (B) an aluminoxane, and (C) an organoaluminum compound of the formula $R^1{}_mAl(OR^2)_{3-m}$ or $R^3{}_mAl(OSiR^4{}_3)_{3-m}$, wherein $R^1$, $R^2$, and $R^3$ are hydrocarbon radicals, $R^4$ is a hydrocarbon, alkoxy, or aryloxy, and m and n are positive numbers from 0 to 3.

Applicants have discovered that the short chain branch frequencies of olefin polymers produced using simple unbridged metallocenes are increased at a given level of comonomer when the unbridged metallocenes are used in catalyst compositions that also contain aluminoxane-impregnated supports made by contacting an aluminoxane with an inert carrier material and heating to a temperature of at least about 80° C., bulky aluminum alkyls of the formula:

$$AlR^1{}_xR^2{}_{(3-x)}$$

wherein $R^1$ is a saturated or unsaturated hydrocarbyl group having 1 to 12 carbon atoms; x is an integer from 0 to 2; $R^2$ is a hydrocarbyl group of the formula $-(CH_2)_y-R^3$, wherein y is an integer from 1 to 8; and $R^3$ is a saturated or unsaturated hydrocarbyl group having 3 to 12 carbon atoms containing at least one ring of at least 3 carbon atoms, and methylaluminoxane. When the mole ratio of aluminum from the bulky aluminum alkyl to metal from the metallocene is about 500, the short chain branch frequency of an olefin polymer made with such a catalyst is often at least about double that of a similar olefin polymer made under identical polymerization conditions using the same olefin monomers in the same molar ratio in the presence of a similar catalyst composition containing the same metallocene, but not the combination of the metallocene with an aluminoxane-impregnated support as defined above, a bulky aluminum alkyl as defined above, and methylaluminoxane.

SUMMARY OF THE INVENTION

The invention provides a catalyst composition comprising: A) an aluminoxane-impregnated support prepared by contacting an aluminoxane with an inert carrier material and heating to a temperature of at least about 80° C.; B) a metallocene of the formula:

$$(L)_y(L')MY_{(x-y-1)}$$

wherein M is a metal from groups IIIB to VIII of the Periodic Table; each L and L' is independently a cycloalkadienyl group bonded to M; each Y is independently hydrogen, an aryl, alkyl, alkenyl, alkylaryl, or arylalkyl radical having 1–20 carbon atoms, a hydrocarboxy radical having 1–20 carbon atoms, a halogen, $RCO_2-$, or $R_2N-$, wherein R is a hydrocarbyl group containing 1 to about 20 carbon atoms; n and m are each 0, 1, 2, 3, or 4; y is 0, 1, or 2; x is 1, 2, 3, or 4; and $x-y \geq 1$; C) a bulky aluminum alkyl of the formula:

$$AlR^1{}_xR^2{}_{(3-x)}$$

wherein $R^1$ is a hydrocarbyl group having 1 to 12 carbon atoms; x is an integer from 0 to 2; $R^2$ is a hydrocarbyl group of the formula $-(CH_2)_y-R^3$, wherein y is an integer from 1 to 8; and $R^3$ is a saturated or unsaturated hydrocarbyl group having 3 to 12 carbon atoms containing at least one ring; and D) methylaluminoxane.

The invention further provides a process for producing an olefin polymer, which comprises contacting at least two olefin monomers under polymerization conditions with the above catalyst composition, as well as olefin polymers, particularly ethylene polymers, produced by this process.

DETAILED DESCRIPTION OF THE INVENTION

The aluminoxane-impregnated support for the catalyst composition is the heat treated, reaction product of an inert carrier material and an aluminoxane. The inert carrier material is solid, particulate, porous, and essentially inert to the polymerization. It is used as a dry powder having an average particle size of about 10 to about 250 microns and preferably about 30 to about 100 microns; a surface area of at least about 3 square meters per gram and preferably at least about 50 square meters per gram; and a pore size of at least about 80 angstroms and preferably at least about 100 angstroms. Generally, the amount of inert carrier material used is that which provides about 0.003 to about 0.6 millimole of metal (from the metallocene) per gram of inert carrier material and preferably about 0.01 to about 0.06 millimole of metal per gram of inert carrier material. Inert carrier material such as silica, alumina, magnesium dichloride, polystyrene, polyethylene, polypropylene, polycarbonate, and any other inert substance that may be used for supporting catalysts, as well as mixtures thereof, are suitable. Silica is preferred.

One or more aluminoxanes are contacted with the inert carrier material to form the aluminoxane-impregnated support. Aluminoxanes are well known in the art and comprise oligomeric linear alkyl aluminoxanes represented by the formula:

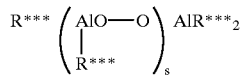

and oligomeric cyclic alkyl aluminoxanes of the formula:

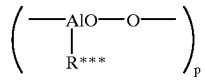

wherein s is 1–40, preferably 10–20; p is 3–40, preferably 3–20; and R*** is an alkyl group containing 1 to 12 carbon atoms, preferably methyl or an aryl radical such as a substituted or unsubstituted phenyl or naphthyl radical.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

Contacting of the aluminoxane with the inert carrier material is performed at a temperature of at least about 80° C. Preferably, temperatures of at least about 85° C. are employed. More preferably, temperatures in the range of about 85 to about 95° C. are used. Contacting preferably takes place for at least about one hour, more preferably at least about three hours. During contacting the aluminoxane is impregnated into the inert carrier material.

The metallocene may be obtained by any conventional means, and has the formula:

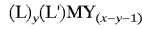

wherein M is a metal from groups IIIB to VIII of the Periodic Table; L and L'are the same or different and are cycloalkadienyl groups such as cyclopentadienyl, indenyl, or fluorenyl groups optionally substituted with one or more hydrocarbyl groups containing 1 to 20 carbon atoms; each Y is hydrogen, an aryl, alkyl, alkenyl, alkylaryl, or arylalkyl radical having 1–20 carbon atoms, a hydrocarboxy radical having 1–20 carbon atoms, a halogen, $RCO_2$—, or $R_2N$—, wherein R is a hydrocarbyl group containing 1 to about 20 carbon atoms; n and m are each 0, 1, 2, 3, or 4; y is 0, 1, or 2; x is 1, 2, 3, or 4 depending upon the valence state of M; and $x-y \geq 1$.

Examples of useful metallocenes include zirconocenes such as bis(cyclopentadienyl)zirconium dichloride; bis(n-butylcyclopentadienyl)zirconium dichloride; bis(cyclopentadienyl)zirconium diphenoxide; bis(cyclopentadienyl)zirconium dibenzoate; bis(n-butylcyclopentadienyl)zirconium diphenoxide; bis(n-butylcyclopentadienyl)zirconium dibenzoate; bis(methylcyclopentadienyl)zirconium dichloride; bis(methylcyclopentadienyl)zirconium dimethyl; bis(cyclopentadienyl)zirconium dichloride; (cyclopentadienyl)(9-fluorenyl)zirconium dichloride; bis(1-indenyl)zirconium dichloride; bis(4,5,6,7-H-tetrahydroindenyl)zirconium dichloride; cyclopentadienylzirconium trichloride; titanocenes such as bis(cyclopentadienyl)titanium dichloride; bis(n-butylcyclopentadienyl)titanium dichloride; bis(cyclopentadienyl)titanium diphenoxide; bis(cyclopentadienyl )titanium dibenzoate; bis(n-butylcyclopentadienyl)zirconium diphenoxide; bis(n-butylcyclopentadienyl)zirconium dibenzoate; bis(methylcyclopentadienyl)titanium dichloride; bis(methylcyclopentadienyl)titanium dimethyl; bis(cyclopentadienyl)titanium dichloride; (cyclopentadienyl)(9-fluorenyl)titanium dichloride; bis(1-indenyl)titanium dichloride; bis(4,5,6,7-H-tetrahydroindenyl)titanium dichloride; cyclopentadienyltitanium trichloride; and hafnocenes such as bis(cyclopentadienyl)hafnium dichloride; bis(n-butylcyclopentadienyl)hafnium dichloride; bis(cyclopentadienyl)hafnium diphenoxide; bis(cyclopentadienyl)hafnium dibenzoate; bis(n-butylcyclopentadienyl)zirconium diphenoxide; bis(n-butylcyclopentadienyl)zirconium dibenzoate; bis(methylcyclopentadienyl)hafnium dichloride; bis(methylcyclopentadienyl)hafnium dimethyl; bis(cyclopentadienyl)hafnium dichloride; (cyclopentadienyl)(9-fluorenyl)hafnium dichloride; bis(1-indenyl)hafnium dichloride; bis(4,5,6,7-H-tetrahydroindenyl)hafnium dichloride; and cyclopentadienylhafnium trichloride; and other compounds such as indenylzirconium tris(diethylamide), indenylzirconium tris(diethylcarbamate), indenylzirconium tris(benzoate), indenylzirconium tris(pivalate), indenylzirconium tris(dimethylcarbamate), indenylzirconium tris(1,5-pentanediylcarbamate), (1-benzylindenyl)zirconium tris(diethylcarbamate), indenyltitanium tris(diethylcarbamate), and indenyltitanium tris(benzoate).

Preferably, the metallocene is selected from the group consisting of bis(cyclopentadienyl)zirconium dichloride, bis(n-butylcyclopentadienyl)zirconium dichloride, bis(methylcyclopentadienyl)zirconium dichloride, indenylzirconium tris(diethylcarbamate), indenylzirconium tris(benzoate), and indenylzirconium tris(pivalate).

In a preferred embodiment of the invention, the metallocene is also impregnated in the inert carrier material. For example, the metallocene may be added as a solution to a slurry of the aluminoxane-impregnated support, after which the solvent(s) are removed by drying, resulting in a free flowing powder.

The catalyst composition further comprises one or more bulky aluminum alkyls of the formula:

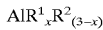

wherein $R^1$ is a saturated or unsaturated hydrocarbyl group having 1 to 12 carbon atoms; x is an integer from 0 to 2; $R^2$ is a hydrocarbyl group of the formula $-(CH_2)_y-R^3$, wherein y is an integer from 1 to 8; and $R^3$ is a saturated or unsaturated hydrocarbyl group having 3 to 12 carbon atoms containing at least one ring. Preferably, $R^1$ is selected from methyl, ethyl, propyl, and isobutyl, y is from 1 to 3, and $R^3$ is selected from cyclopentyl, cyclohexyl, cyclohexenyl, norbornyl, and norbornenyl.

Particularly preferred bulky aluminum alkyls are tris(2-(4-cyclohexenyl)ethyl)aluminum, tris((cyclohexyl)ethyl) aluminum, and diisobutyl(2-(4-cyclohexenyl)ethyl) aluminum. Most preferably the bulky aluminum alkyl is tris(2-(4-cyclohexenyl)ethyl)aluminum.

The fourth component of the catalyst composition is methylaluminoxane. The methylaluminoxane is separate and apart from the aluminoxane (which may or may not comprise methylaluminoxane) fixed on the aluminoxane-containing support. Typically, the mole ratio of aluminum from methylaluminoxane to metal from the metallocene in the catalyst composition ranges from about 10:1 to about 1000:1, preferably 25:1 to about 500:1, more preferably about 100:1 to about 300:1.

The amount of aluminoxane employed in the aluminoxane-impregnated support may also vary over a wide range. Preferably, the mole ratio of aluminum from such aluminoxane to metal contained in the metallocene is generally in the range of from about 2:1 to about 100,000:1, more preferably in the range of from about 10:1 to about 10,000:1, and most preferably in the range of from about 50:1 to about 2,000:1.

The mole ratio of aluminum from the bulky aluminum alkyl to metal from the metallocene present in the catalyst composition is from about 20:1 to about 1500:1, preferably from about 100:1 to about 800:1, more preferably from about 150:1 to about 700:1.

The catalyst composition may be used to prepare olefin polymers by polymerizing two or more olefin monomers such as ethylene, higher alpha-olefins containing 3 to about 20 carbon atoms, and dienes, to produce olefin polymers having densities ranging from about 0.86 to about 0.950. Suitable higher alpha-olefins include, for example, propylene, 1-butene, 1-pentene, 1-hexene, 4-methyl-1-pentene, 1-octene and 3,5,5-trimethyl-1-hexene. Preferred dienes are linear, branched, or cyclic hydrocarbon dienes having from about 4 to about 20 carbon atoms. Especially preferred dienes include 1,3-butadiene, 1,5-hexadiene, 1,7-octadiene and the like. Olefin polymers that may be made according to the invention include ethylene polymers, including ethylene/propylene rubbers (EPR's), ethylene/propylene/diene terpolymers (EPDM's) and the like. Aromatic compounds having vinyl unsaturation, such as styrene and substituted styrenes, may be included as comonomers as well. Particularly preferred olefin polymers are ethylene copolymers containing about 1 to about 40 percent by weight of a comonomer selected from propylene, 1-butene, 1-hexene, and mixtures thereof.

Polymerization may be conducted in the gas phase in a stirred or fluidized bed reactor, or in the solution or slurry phase using equipment and procedures well known in the art. The desired monomers are contacted with an effective amount of catalyst composition at a temperature and a pressure sufficient to initiate polymerization. The process may be carried out in a single reactor or in two or more reactors in series. The process is conducted substantially in the absence of catalyst poisons such as moisture, oxygen, carbon dioxide, and acetylene, since only minor amounts (i.e. $\leq 2$ ppm) of such materials have been found to affect the polymerization adversely.

Conventional additives may be included in the process, provided they do not interfere with the operation of the catalyst composition in forming the desired polyolefin.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds may be employed as scavenging agents for poisons to increase the catalyst activity. Examples of these compounds are metal alkyls, preferably aluminum alkyls such as triisobutylaluminum. Use of such scavenging agents is well known in the art.

Olefin polymers produced in the presence of the catalyst composition have an increased comonomer content relative to similar olefin polymers produced under identical polymerization conditions from the same olefin monomers in the same molar ratio in the presence of a similar catalyst composition containing the same metallocene but without an aluminoxane-impregnated support, a bulky aluminum alkyl, and methylaluminoxane. In particular, when the amount of bulky aluminum alkyl used in the present catalyst composition is such that the mole ratio of aluminum from the bulky aluminum alkyl to metal from the metallocene is about 500, the short chain branch frequency of an olefin polymer produced in the presence of this catalyst composition is greater by at least about 50%, preferably at least about 100%, than the short chain branch frequency of a similar olefin polymer produced in the presence of a similar catalyst composition containing the same metallocene without the combination of an aluminoxane-impregnated support, bulky aluminum alkyl, and methylaluminoxane.

Although the invention is not bound by theory, it is believed that the combination of the heat treated, aluminoxane-impregnated support, bulky aluminum alkyl, and methylaluminoxane increases the comonomer incorporation abilities of simple metallocenes, at least in part because the bulky alkyl groups of the bulky aluminum alkyl associate with the aluminoxane fixed on the inert carrier material, increasing the separation between the aluminoxane and the metal center of the metallocene. This provides comonomers greater access to the metal center, increasing the likelihood of their incorporation into growing polymer chains.

Ethylene polymers produced according to the invention, for instance ethylene/1-hexene copolymers, often have short chain branch frequencies of at least about 6, preferably at least about 10, more preferably at least about 20 short chain branches per 1000 main chain carbon atoms. In the case of ethylene/1-hexene copolymers, the short chain branches are butyl branches. One useful method of estimating the frequency of short chain branches in an olefin polymer is by infrared spectroscopy as described by Blitz and McFaddin in *J. Appl. Pol. Sci.*, 1994,51, 13. A polyethylene sample is first pressed into a 25 mil plaque, for example using a WABASH steam press. The plaque is allowed to relax at room temperature in open air for at least 16 hours. The sample is then placed in a sealed evacuable jar and exposed to bromine vapor at reduced total pressure for 2 hours. The bromine is evacuated from the jar and the bromine-treated sample is then exposed to air for at least 16 hours, at which point all the dissolved, unreacted bromine is preferably dissipated from the polymer. Next, an infrared spectrum of the sample is obtained, for instance using a NICOLET 510 spectrometer (4 $cm^{-1}$ resolution, 32 scans).

In the case of butyl branches, the integrated absorption of the 893 $cm^{-1}$ band is used to estimate amount of 1-hexene incorporation. For estimation of plaque "thickness," the absorbance at 4166 cm$^{-1}$, which lies within a C—H bond overtone band, is measured by subtracting a baseline drawn between the lowest points in the frequency range 4600–3200 cm$^{-1}$. One then draws a baseline between the absorbances at 910 and 881 cm$^{-1}$, and integrates the peak area above this baseline. By dividing this area by the "thickness" in cm, which is obtained by taking the absorbance at 4166 cm$^{-1}$ and multiplying it by 0.05588, one calculates the integrated absorbance of the sample. This number is then converted to an estimated branch frequency by the use of the relation below derived from a correlation with $^{13}$C nmr estimates of butyl branch frequency, $$BF = (3 \pm 4) + \left((0.92 \pm 0.10) \cdot \int_{881}^{910} A_{893} \, dv\right)$$

and a yield branch frequency, short chain branches per 1000 main chain carbons, which approximates the nmr measurement to within about 10%.

The following examples further illustrate the invention.

EXAMPLES

Glossary

Density in g/ml was determined in accordance with ASTM 1505, based on ASTM D-1928, procedure C, plaque preparation. Plaques were made and conditioned for one hour at 100° C. to approach equilibrium crystallinity, measurement for density was then made in a density gradient column.

Activity is given in kg/mmol Zr·hr·100 psi ethylene.

MI is the melt index, reported as grams per 10 minutes, determined in accordance with ASTM D-1238, condition E, at 190° C.

FI is the flow index, reported as grams per 10 minutes, determined in accordance with ASTM D-1238, condition F, and was measured at ten times the weight used in the melt index text.

MFR is the melt flow ratio, which is the ratio of flow index to melt index. It is related to the molecular weight distribution of the polymer.

BuCpZ is bis(n-butylcyclopentadienyl)zirconium dichloride.

CpZ is bis(cyclopentadienyl)zirconium dichloride.

MAO is methylaluminoxane in toluene, 2 mol Al/L (ALBEMARLE).

MMAO is modified methylaluminoxane in heptane, 2 mol Al/L (MMAO-3A, AKZO NOBEL).

TiBA is triisobutylaluminum, 25 wt % in hexanes.

TCHEA is tris(2-(4-cyclohexenyl)ethyl)aluminum.

TCyEA is tris(2-(cyclohexyl)ethyl)aluminum.

Isoprenyl Al is isoprenylaluminum, 29 wt % in hexanes (AKZO NOBEL).

DIBAL-H is diisobutylaluminum hydride, 1 mol/L in hexanes (ALDRICH).

DMA is N,N-dimethylaniline.

TBA is tri-n-butylamine.

Wt % Vinyl, Wt % Internal, and Wt % Pendant Unsaturation

Polyethylene plaques were prepared according to the procedure laid out above for estimation of short chain branching frequency. For each sample, after one day of annealing at room temperature, the IR spectrum was recorded. The "thickness" of the sample was then estimated from the absorption at 4166 cm$^{-1}$ as shown above. Following bromine treatment and elimination of residual bromine, the IR spectrum was recorded a second time, and this spectrum was mathematically subtracted from the first to produce a third spectrum from which absorbances due to C=C bonds were quantified by drawing a baseline between the ends of each band and subtracting that baseline from the spectrum to obtain a corrected peak height. These heights were then converted into weight percent unsaturation using the following formulae:

wt %vinyl=$A_{909cm^{-1}}$·0.0198/$t(cm)$ wt %internal=$A_{967cm^{-1}}$·0.0282/$t(cm)$ wt %pendant=$A_{887cm^{-1}}$·0.0232/$t(cm)$ where "vinyl" indicates —CH=CH$_2$ groups, "internal" indicates trans —CH=CH— groups, and "pendant" indicates —RCH=CH$_2$ groups where R is an alkyl group.

Preparation of TCHEA

A bulky aluminum alkyl, TCHEA, was prepared according to the procedure described in U.S. Pat. No. 3,154,594. In a 200 mL Schlenk flask under nitrogen were mixed 64 g of 25 wt % TiBA in hexane (81 mmol) and 30 mL of 4-vinylcyclohexene (230 mmol) at reflux for about 20 hours. After this, solvent and residual starting materials were removed in vacuo with an oil-bath temperature set at about 120° C. A colorless, viscous liquid remained which was analyzed by $^{13}$C nmr (predominant peaks in toluene-d$_8$ (ppm): 38.3, 32.7, 32.0, 28.8, 28.3, 7.7).

Preparation of TCyEA

To a small Schlenk flask held under nitrogen were added 3.4 mL of TiBA in hexanes (3.0 mmol) and the hexanes were removed at room temperature in vacuo. To the flask were then added 1.3 g of vinylcyclohexane (12 mmol), and the mixture was stirred at 110° C. for 24 hours. The volatiles were removed in vacuo at 120° C. A non-viscous, clear, colorless liquid was obtained which was analyzed by $^{13}$C nmr (predominant peaks in toluene-d$_8$ (ppm): 42.9, 33.6, 27.3, 27.0, ca. 8).

Preparation of Supported, Heated BuCpZ

A 1-gallon jacketed vessel equipped with a helical impeller was charged with 1.39 L of nitrogen-sparged toluene and 2.8 L of MAO in toluene (10 weight %), which were mixed for one hour. Next, 810 g of silica (DAVISON 955, previously dried at 600° C.) were added to the reactor, and the resulting slurry was stirred for approximately 5 hours 90° C. The slurry was then allowed to cool to room temperature and stirred for about 12 hours. To this mixture was then added a solution of 25 g BuCpZ in about 450 mL toluene. This solution was stirred under nitrogen for 2 hours. The toluene was removed by placing the vessel under partial vacuum while heating the jacket to about 100° C. with a nitrogen sweep over the material. From the reactor were recovered 1.61 kg of deep yellow, free-flowing powder. The catalyst composition was subsequently passed through a sieve with 600 μm mesh and stored under nitrogen.

Preparation of Supported BuCpZ (Comparative)

A 1-gallon jacketed vessel equipped with a helical impeller was charged with 4.35 L MAO in toluene (10 weight %)

and a solution of 13 g BuCpZ in about 370 mL toluene. These were mixed at ambient temperature for 3 hours. Next, 530 g of silica (DAVISON 955, previously dried at 600° C.) were added to the reactor, and the resulting slurry was stirred for approximately 16 hours at ambient temperature. The toluene was removed by placing the vessel under partial vacuum while heating the jacket to about 90° C. with a nitrogen sweep over the material. From the reactor were recovered 770 g of deep yellow, free-flowing powder. ICP analysis showed the catalyst composition to have 3.3 ¥ 10$^{-5}$ moles Zr/g and 6.2 ¥ 10$^{-3}$ moles Al/g. The catalyst was subsequently passed through a sieve with 600 μm mesh and stored under nitrogen.

Preparation of Supported, Heated CpZ

A Schlenk flask was charged with 3.01 g of silica (DAVISON 955, previously dried at 600° C.), 5 mL of distilled toluene, and 13 mL of MAO in toluene (10 weight %). The contents were stirred under nitrogen at 85–95° C. for 3 hours. The flask was then allowed to cool to room temperature. To this flask was then added a solution of 44 mg of CpZ in 15 mL of toluene, and the mixture was stirred for 0.5 hour. The slurry was then dried at 45° C. under vacuum until a free-flowing, light yellow solid (4.32 g).

Preparation of Supported CpZ (Comparative)

A Schlenk flask was charged with 3.05 g silica (DAVISON 955, previously dried at 600° C.), 5 mL distilled toluene, and 13 ML MAO in toluene (10 weight %). The flask was then agitated at room temperature for several minutes. To this flask was then added a solution of 43 mg CpZ in about 10 mL toluene, and the mixture was stirred for 1.5 hours. The slurry was then dried at 45° C. under vacuum to a free-flowing, light yellow solid (3.2 g). ICP analysis showed the catalyst composition to have 3.8 ¥ 10$^{-5}$ moles Zr/g and 3.8 ¥ 10$^{-3}$ moles Al/g.

Polymerizations

Referring to the Table, a series of slurry phase polymerizations of ethylene and 1-hexene were performed in a 1.6 liter, stirred autoclave using various supported and unsupported catalyst compositions containing BuCpZ and CpZ. The data reported in the Table shows that only the Examples using catalyst compositions comprising either supported, heated BuCpZ or supported, heated CpZ, along with TCHEA or TCyEA and methylaluminoxane, showed notable increase in butyl branching frequency as measured by IR.

Polymerization with the supported catalyst compositions was conducted as follows. In a 4-oz glass bottle were mixed 50 mL of nitrogen-sparged hexane, a slurry of 50 mg of supported catalyst composition in 3 mL mineral oil, methylaluminoxane solution (when used), and additive solution (when used). The contents of this bottle were transferred into the autoclave, after which a mixture of 52 mL of 1-hexene and 600 mL of additional hexane were added. Next, ethylene was admitted to the reactor, which caused the total reactor pressure to rise to 150 psi as the internal temperature was raised to 85° C. Polymerization was terminated after 30 minutes by venting the reactor and cooling its contents. The polymer was recovered by blending the reactor contents with a 1:1 by volume mixture of isopropyl and methyl alcohols and filtering. The polymer was then dried for at least 15 hours in partial vacuum while heated to about 40° C.

Polymerization with the unsupported catalyst compositions was accomplished as follows. In a 4-oz glass bottle were mixed 50 mL of nitrogen-sparged hexane, a solution of BuCpZ or CpZ in toluene, methylaluminoxane solution, and additive solution (when used). The contents of this bottle were transferred into the autoclave, after which a mixture of 26 mL 1-hexene and 600 mL additional hexane was added. Next, ethylene was admitted to the reactor, which caused the total reactor pressure to rise to 150 psi as internal temperature was raised to 80° C. Polymerization was terminated after 30 minutes by venting the reactor and cooling its contents. The polymer was recovered by blending the reactor contents with a 1:1 by volume mixture of isopropyl and methyl alcohols and filtering. The polymer was then dried for at least 15 hours in partial vacuum while heated to about 40° C.

In the Examples where an additive was added to the polymerization reaction, the additive was added to the 4-oz glass bottle prior to injection into the autoclave.

Examples 4, 5, 8, 29, 33, and 35 according to the invention had butyl branching frequencies as measured by IR in the range of 20 to 55. Examples 30 and 39, also according to the invention, had butyl branching frequencies of 14 and 9, respectively; however it is believed that the TCHEA used in these Examples (as well as in Examples 31, 32, and 38) was contaminated with impurities. The remaining comparative Examples had butyl branching frequencies in the range of 6 to 30.

TABLE

| Example | MAO/Zr mole ratio | Additive(s) | Additive(s)/Zr mole ratio | Activity | IR BBF | Density | MI | FI | MFR | wt % vinyl | wt % internal | wt % pendant |
| --- | --- | --- | --- | --- | --- | --- | --- | --- | --- | --- | --- | --- |
| | Supported, Heated BuCpZ | | | | | | | | | | | |
| | Zr (mmol/g): | | 0.037 | | | | | | | | | |
| | Al/Zr Mole Ratio: | | 204 | | | | | | | | | |
| 1 | 540 | none | 0 | 33.2 | 19 | | 2.8 | 71 | 25 | 0.011 | 0.008 | 0.083 |
| 2 | 540 | none | 0 | 32.5 | 21 | 0.9120 | 1.7 | 39 | 23 | 0.014 | 0.003 | 0.050 |
| 3 | 0 | MMAO | 500 | 27.8 | 19 | 0.9132 | 1.1 | 21.3 | 23 | 0.014 | 0.000 | 0.037 |
| *4 | 540 | TCHEA | 150 | 35.1 | 33 | | 1.4 | 35 | 25 | 0.018 | 0.005 | 0.053 |
| *5 | 540 | TCHEA | 460 | 38.8 | 44 | | 1.7 | 58 | 34 | 0.026 | 0.000 | 0.037 |
| 6 | 0 | TCHEA | 460 | 24.9 | 22 | 0.9100 | — | 12.3 | — | 0.017 | 0.007 | 0.013 |
| 7 | 0 | TCHEA, MMAO | 460 | 27.7 | 24 | 0.9113 | 1.1 | 21.4 | 19 | 0.022 | 0.000 | 0.025 |
| *8 | 540 | TCyEA | 460 | 44.2 | 45 | 0.8884 | 0.9 | 33 | 37 | 0.023 | 0.001 | 0.035 |
| 9 | 540 | TiBA | 280 | 32.7 | 30 | | 1.2 | 26.7 | 22 | 0.020 | 0.003 | 0.033 |
| 10 | 540 | TiBA | 470 | 28.5 | 24 | 0.9092 | 0.9 | 19.3 | 21 | 0.016 | 0.000 | 0.029 |
| 11 | 540 | cyclohexene | 1330 | 29.1 | 16 | | 1.6 | 37.1 | 23 | 0.012 | 0.005 | 0.059 |
| 12 | 667 | DIBAL-H | 470 | 35.7 | 25.1 | | 3.36 | 65.7 | 19.5 | | | |
| | Supported BuCpZ | | | | | | | | | | | |
| | Zr (mmol/g): | | 0.033 | | | | | | | | | |

TABLE-continued

| Example | MAO/Zr mole ratio | Additive(s) | Additive(s)/Zr mole ratio | Activity | IR BBF | Density | MI | FI | MFR | wt % vinyl | wt % internal | wt % pendant |
|---|---|---|---|---|---|---|---|---|---|---|---|---|
| | | Al/Zr Mole Ratio: | 187 | | | | | | | | | |
| 13 | 610 | none | 0 | 29.5 | 15 | 0.9180 | 1.3 | 37 | 29 | 0.011 | 0.008 | 0.063 |
| 14 | 610 | TCHEA | 510 | 32.4 | 20 | 0.9127 | 1.1 | 23 | 20 | 0.015 | 0.008 | 0.030 |
| 15 | 0 | MMAO | 500 | 30.5 | 21 | 0.9178 | 1 | 20 | 20 | 0.010 | 0.006 | 0.038 |
| 16 | 0 | TCHEA, MMAO | 510 | 32.7 | 20 | 0.9162 | 0.6 | 10.8 | 18 | 0.013 | 0.008 | 0.014 |
| | Supported BuCpZ | | | | | | | | | | | |
| | Zr (mmol/g): | | 0.025 | | | | | | | | | |
| | | Al/Zr Mole Ratio: | 96 | | | | | | | | | |
| 17 | 800 | none | 0 | 38.5 | 17 | | 0.53 | 10.6 | 20 | 0.010 | 0.008 | 0.021 |
| 18 | 800 | TCHEA | 680 | 27.1 | 17 | | 1.3 | 23.4 | 18 | 0.018 | 0.004 | 0.028 |
| | Supported CpZ | | | | | | | | | | | |
| | Zr (mmol/g): | | 0.038 | | | | | | | | | |
| | | Al/Zr Mole Ratio: | 100 | | | | | | | | | |
| 19 | 530 | none | 0 | 23.3 | 9 | 0.9284 | 18.4 | 480 | 26 | 0.024 | 0.006 | 0.011 |
| 20 | 530 | TCHEA | 450 | 22.8 | 19 | 0.9180 | 1.8 | 38 | 21 | 0.027 | 0.005 | 0.039 |
| 21 | 530 | DMA | 5 | 14.9 | 9 | | 9.7 | 260 | 27 | 0.028 | 0.006 | 0.091 |
| 22 | 530 | DMA | 5 | 7.4 | 9 | 0.9343 | 8 | 280 | 35 | 0.033 | 0.000 | 0.064 |
| 23 | 530 | TBA | 5 | 6.1 | 7 | 0.9391 | 6 | 190 | 32 | 0.035 | 0.000 | 0.060 |
| 24 | 530 | TCHEA, DMA | 450, 5 | 16.6 | 12 | | 1.6 | 32 | 20 | 0.026 | 0.006 | 0.028 |
| | Supported, Heated CpZ | | | | | | | | | | | |
| | Zr (mmol/g): | | 0.033 | | | | | | | | | |
| | | Al/Zr Mole Ratio: | 154 | | | | | | | | | |
| 25 | 610 | none | 0 | 40.1 | 17 | 0.9211 | 19.6 | 710 | 36 | 0.027 | 0.005 | 0.121 |
| 26 | 0 | MMAO | 500 | 22.8 | 12 | 0.9255 | 6.6 | 140 | 21 | 0.026 | 0.005 | 0.064 |
| 27 | 610 | DMA | 5 | 12.3 | 9 | 0.9321 | 6.6 | 220 | 33 | 0.029 | 0.000 | 0.074 |
| 28 | 0 | TiBA | 530 | 18.4 | 25 | 0.9069 | 0.7 | 16.8 | 24 | 0.029 | 0.000 | 0.011 |
| *29 | 610 | TCHEA | 510 | 46.0 | 55 | 0.8863 | 1.5 | 51 | 34 | 0.030 | 0.000 | 0.063 |
| *30 | 610 | TCHEA | 510 | 22.8 | 14 | 0.9229 | 2 | 42 | 21 | 0.026 | 0.000 | 0.047 |
| 31 | 0 | TCHEA | 510 | 8.8 | 13 | 0.9277 | 1.6 | 31 | 19 | 0.025 | 0.000 | 0.012 |
| 32 | 0 | TCHEA, MMAO | 510 | 18.5 | 10 | 0.9270 | 1.1 | 22.0 | 20 | 0.024 | 0.000 | 0.023 |
| *33 | 610 | TCHEA, 150 ccH$_2$ | 510 | 39.2 | 32 | 0.9089 | 15.6 | 480 | 31 | 0.028 | 0.000 | 0.049 |
| 34 | 610 | isoprenyl Al | ca. 500 | 9.0 | 9 | 0.9337 | 1.8 | 52 | 29 | 0.025 | 0.005 | 0.057 |
| | Supported, Heated CpZ | | | | | | | | | | | |
| | Zr (mmol/g): | | 0.023 | | | | | | | | | |
| | | Al/Zr Mole Ratio: | 199 | | | | | | | | | |
| *35 | 870 | TCHEA | 740 | 45.2 | 20 | 0.9115 | 1.7 | 54 | 32 | 0.033 | 0.006 | 0.019 |
| 36 | 870 | TiBA | 760 | 15.5 | 18 | 0.9197 | 1.4 | 30 | 22 | 0.037 | 0.006 | 0.021 |
| | Suported, Heated CpZ | | | | | | | | | | | |
| | Zr (mmol/g): | | 0.039 | | | | | | | | | |
| | | Al/Zr Mole Ratio: | 103 | | | | | | | | | |
| 37 | 510 | none | 0 | 29.0 | 9 | 0.9311 | 53 | 840 | 16 | 0.025 | 0.005 | 0.117 |
| 38 | 0 | TCHEA | 430 | 5.6 | 20 | 0.9246 | — | — | — | 0.025 | 0.000 | 0.009 |
| *39 | 510 | TCHEA | 430 | 12.1 | 9 | 0.9295 | 0.82 | 20.3 | 25 | 0.021 | 0.006 | 0.043 |
| | Supported, Heated CpZ | | | | | | | | | | | |
| | Zr (mmol/g): | | 0.03 | | | | | | | | | |
| | | Al/Zr Mole Ratio: | 177 | | | | | | | | | |
| 40 | 670 | none | 0 | 29.9 | 23 | 0.9183 | 5.3 | 170 | 32 | 0.020 | 0.000 | 0.101 |
| 41 | 670 | none | 0 | 19.8 | 8 | 0.9293 | 15.4 | 340 | 22 | 0.023 | 0.000 | 0.082 |
| 42 | 670 | none | 0 | 36.0 | 10 | 0.9279 | 12.6 | 275 | 22 | 0.023 | 0.006 | 0.097 |
| | Suppoeted CpZ | | | | | | | | | | | |
| | Zr (mmol/g): | | 0.035 | | | | | | | | | |
| | | Al/Zr Mole Ratio: | 171 | | | | | | | | | |
| 43 | 570 | none | 0 | 25.1 | 18 | 0.9125 | 1.5 | 46 | 31 | 0.029 | 0.004 | 0.061 |
| 44 | 570 | TCHEA | 480 | 33.9 | 23 | 0.9119 | 2.4 | 61 | 26 | 0.033 | 0.007 | 0.038 |
| | Supported CpZ | | | | | | | | | | | |
| | Zr (mmol/g): | | 0.022 | | | | | | | | | |
| | | Al/Zr Mole Ratio: | 189 | | | | | | | | | |
| 45 | 910 | none | 0 | 17.2 | 9 | 0.9280 | 1 | 24.3 | 25 | 0.022 | 0.005 | 0.045 |
| 46 | 910 | TCHEA | 770 | 24.2 | 24 | 0.9089 | 0.54 | 20.8 | 39 | | | |
| | Unsupported BuCpZ/MAO | | | | | | | | | | | |
| 47 | 1000 | none | 0 | 124.0 | 10 | — | 0.88 | 21 | 24 | 0.011 | 0.006 | 0.056 |
| 48 | 1000 | none | 0 | 73.8 | 7 | — | 0.25 | 9.0 | 36 | 0.015 | 0.003 | 0.039 |
| 49 | 1000 | TCHEA | 1700 | 77.2 | 9 | — | — | 4.3 | — | 0.014 | 0.004 | 0.028 |
| 50 | 500 | none | 0 | 63.4 | 9 | — | — | 1.6 | — | 0.013 | 0.002 | 0.026 |
| 51 | 500 | TCHEA | 1700 | 18.8 | 6 | — | — | 0.4 | — | 0.012 | 0.003 | 0.004 |
| | Unsupported CpZ/MAO | | | | | | | | | | | |
| 52 | 500 | none | 0 | 29.1 | 8 | 0.9329 | 66 | — | — | 0.026 | 0.005 | 0.127 |
| 53 | 500** | none | 0 | 30.0 | 10 | 0.9271 | 8.5 | 210.0 | 24 | 0.020 | 0.005 | 0.079 |
| 54 | 250 | TCHEA | 148 | 10.2 | 10 | 0.9226 | 1.2 | 29.0 | 24 | 0.031 | 0.005 | 0.037 |

*according to invention
**MMAO/Zr mole ratio

We claim:

1. A process for producing an olefin polymer, which comprises contacting at least two olefin monomers under polymerization conditions with a catalyst composition comprising:
   A) an aluminoxane-impregnated support prepared by contacting an aluminoxane with an inert carrier material and heating to a temperature of at least about 80° C.;
   B) a metallocene of the formula:

$(L)_y(L')MY_{(x-y-1)}$ wherein M is a metal from groups IVB to VIB of the Periodic Table; each L and L' is independently an unsubstituted or substituted cyclopentadienyl group bonded to M; each Y is independently hydrogen, an aryl, alkyl, alkenyl, alkylaryl, or arylalkyl radical having 1–20 carbon atoms, a hydrocarboxy radical having from 1–20 carbon atoms, a halogen, $RCO_2$—, or $R_2N$—, wherein R is a hydrocarbyl group containing 1 to about 20 carbon atoms; y is 0, 1, or 2; x is 1, 2, 3, or 4; and x–y≧1;
   C) a bulky aluminum alkyl of the formula:

$AlR^1_x R^2_{(3-x)}$ wherein $R^1$ is a hydrocarbyl group having 1 to 12 carbon atoms; x is an integer from 0 to 2; $R^2$ is a hydrocarbyl group of the formula —$(CH_2)_y$—$R^3$, wherein y is an integer from 1 to 8; and $R^3$ is a saturated or unsaturated hydrocarbyl group having 3 to 12 carbon atoms containing at least one ring; and
   D) methylaluminoxane.

2. The process of claim 1 conducted in the gas phase.

3. The process of claim 1, wherein the olefin monomers comprise ethylene and at least one higher alpha-olefin or diene.

4. The process of claim 3, wherein the higher alpha-olefin is selected from the group consisting of propylene, 1-butene, 1-hexene, and mixtures thereof.

5. The process of claim 1, wherein the inert carrier material comprises silica, the aluminoxane is selected from the group consisting of methylaluminoxane and modified methylaluminoxane, the metallocene catalyst is selected from the group consisting of bis(cyclopentadienyl) zirconium dichloride, bis(n-butylcyclopentadienyl) zirconium dichloride, bis(methylcyclopentadienyl) zirconium dichloride, indenylzirconium tris (diethylcarbamate), indenylzirconium tris(benzoate), and indenylzirconium tris(pivalate), and the bulky aluminum alkyl is selected from the group consisting of tris(2-(4-cyclohexenyl)ethyl)aluminum, tris((cyclohexyl)ethyl) aluminum, and diisobutyl(2-(4-cyclohexenyl)ethyl) aluminum.

6. The process of claim 1, wherein the mole ratio of aluminum from the bulky aluminum alkyl to metal from the metallocene is about 500 and the olefin polymer produced has a short chain branch frequency at least about double that of a similar olefin polymer produced under identical polymerization conditions from the same olefin monomers in the same molar ratio, but in the presence of a similar catalyst composition comprising the same metallocene but not the aluminoxane-impregnated-impregnated support, bulky aluminum alkyl, and methylaluminoxane.

7. The process of claim 1 wherein M is a Group IV metal.

8. The process of claim 1 wherein M is zirconium.

* * * * *